United States Patent [19]

Maloney et al.

[11] 4,335,660

[45] Jun. 22, 1982

[54] APPARATUS AND METHOD FOR FLUE GAS RECIRCULATION IN A SOLID FUEL BOILER

[75] Inventors: Kenneth L. Maloney, Laguna Beach; Nick B. de Volo, Irvine, both of Calif.

[73] Assignee: Research Cottrell Technologies, Inc., Irvine, Calif.

[21] Appl. No.: 155,672

[22] Filed: Jun. 2, 1980

[51] Int. Cl.³ .............................................. F23B 5/02
[52] U.S. Cl. .................................... 110/206; 110/205; 110/207; 110/344; 110/345
[58] Field of Search ............... 110/205, 206, 207, 204, 110/345, 343, 344; 431/115, 116

[56] References Cited

U.S. PATENT DOCUMENTS

| | | | |
|---|---|---|---|
| 750,786 | 1/1904 | Willard | 110/206 |
| 1,319,402 | 10/1919 | McGehee | 110/205 |
| 1,446,931 | 2/1923 | Rutherford | 110/205 |
| 2,118,625 | 5/1938 | Scholl | 110/206 |
| 2,763,221 | 9/1956 | Miller | 110/206 |
| 4,185,080 | 1/1980 | Rechmeier | 110/343 X |

OTHER PUBLICATIONS

Giammer et al., *Experimental Studies on the Feasibility of In-Furnace Control of $SO_2$ and $NO_x$ Emissions from Industrial Stokers*, Battelle Energy, Dec. 15, 1975.

Primary Examiner—Edward G. Favors
Attorney, Agent, or Firm—Blakely, Sokoloff, Taylor & Zafman

[57] ABSTRACT

A solid fuel boiler or furnace with a flue gas-air mixture introduced into the fuel grate is disclosed. The flue gas is mixed with air such that approximately 30% of the mixture is flue gas. By providing this mixture under the burning fuel bed, the temperature of the fuel bed is lowered and excess oxygen is reduced. A more reactive fuel bed results providing various advantages including improved boiler operation and a clinker-free fuel bed.

32 Claims, 6 Drawing Figures

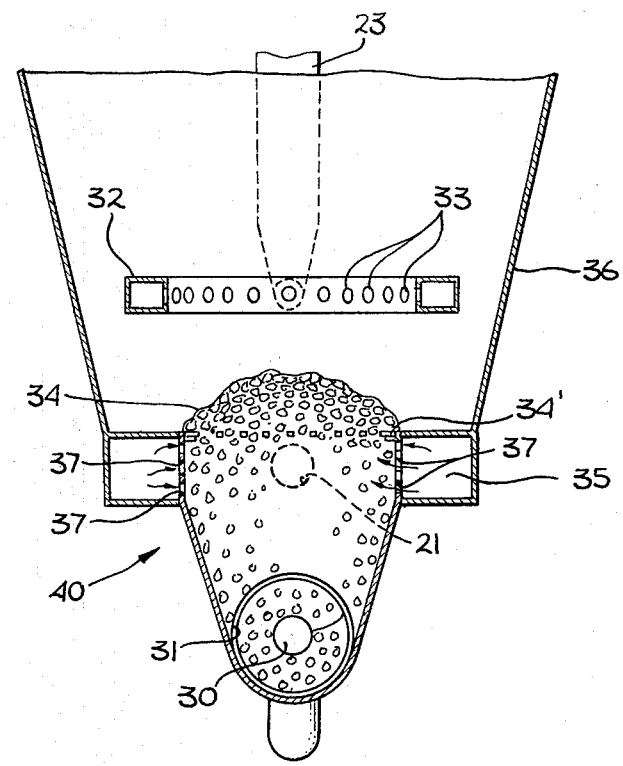
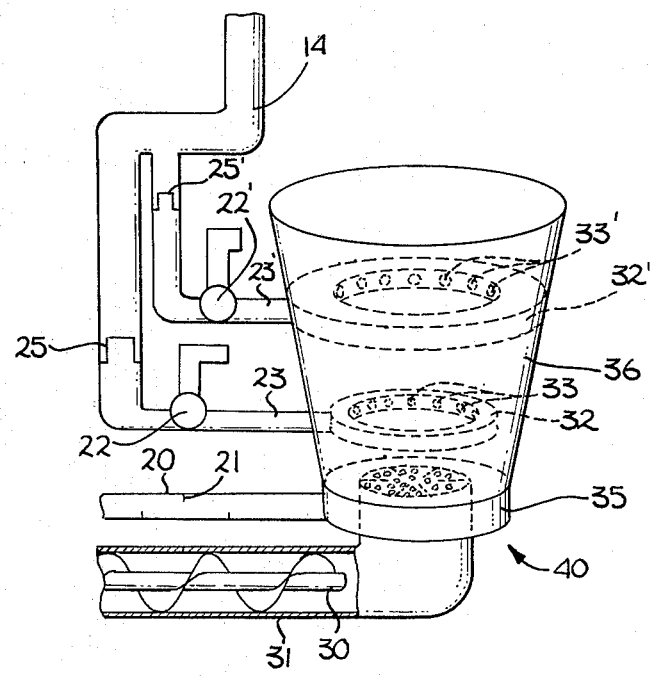

APPARATUS AND METHOD FOR FLUE GAS RECIRCULATION IN A SOLID FUEL BOILER

BACKGROUND OF THE INVENTION

1. Field of the Invention

This invention relates to the field of utilizing flue gas recirculation on solid fuel fired boilers and furnaces.

2. Prior Art

Flue gas recirculation (FGR) in boilers and furnaces is a technique generally known in the prior art. Flue gas is commonly introduced into a combustion chamber within a boiler above the burning fuel bed. This continual recycling of the flue gas results in a further burning of smoke and other particulate matter contained therein. Additionally, the formation of various nitric and nitrous oxides and carbon monoxide gases in the flue gas is reduced thereby minimizing the releasing of these undesirable gases into the atmosphere.

For example, U.S. Pat. No. 4,089,278 issued to Brandt is typical of most FGR apparatus. Brandt teaches the removal of flue gases from a stack and directing these flue gases through a conduit and then into the combustion chamber above the burning fuel. This technique is also utilized in liquid or gas fired systems, see for example Carson et al U.S. Pat. No. 3,854,455. It should be apparent that systems which utilize a fluid or gaseous fuel do not possess all of the same set of problems associated with coal fired boilers and furnaces. For example, fluid or gaseous fuels do not have the problems of clinker formation and do not involve fuel bed structures.

A different approach to the use of FGR is disclosed in U.S. Pat. No. 2,561,717 issued to Vicard. Vicard teaches removing flue gas from the stack of a furnace or boiler and dividing the gas into two different portions. The first portion, which is entirely flue gas, is channeled to the fuel bed prior to the area at which combustion is taking place. Vicard uses this first portion of flue gas to preheat and dry the coal prior to combustion. To the extent that the fuel bed is charged with nearly 100% flue gas (which is non-combustible) the fuel bed will not burn. Vicard uses this fact to prevent combustion from occuring where it is not desired. This is one object of FGR as used in Vicard. The second portion of flue gas is combined with air and water vapor produced by an atomizer in a chamber under the combustion portion of the fuel bed. The object of this second portion of FGR in Vicard is to use the flue gas-water vapor mixture to reduce slag formation by introducing steam with the combustion air. That is, the flue gas is used to heat added water droplets to form steam which then passes through the fuel bed.

Other prior art references which applicants are aware of are U.S. Pat. Nos. 3,781,162, 3,277,945, 3,905,745, and 3,892,191. None of the prior art references discloses the overall use of recirculated flue gas for coal fired boilers where the flue gas is introduced into the primary undergrate combustion air for reducing noxious pollutants (e.g. $NO_x$ and carbon monoxide), reducing fuel bed clinkering and reducing smoke emissions. The main advantages of the present invention will be discussed in greater detail hereinafter.

SUMMARY OF THE INVENTION

The present invention teaches the use of recycled flue gas mixed with air and introduced into the primary undergrate combustion air of a solid fuel fired boiler. An air-flue gas mixture which is at least approximately 25% flue gas supplied in this manner creates a fuel bed that is more reactive than one without this mixture. However, it should be noted that when this ratio exceeds approximately 50%, there may not be sufficient oxygen to maintain a usefully high temperature in the combustion chamber. This more reactive fuel bed results from the presence of water vapor, a normal constituent of flue gas, which reduces the excess oxygen requirements of a burning coal bed. The reduced oxygen demand is accomplished by the increased carbon activation caused by the water (as water vapor) in close contact with the coal. Stated another way, reduced overall excess air combustion results from the endothermic reaction of the moisture in the flue gas with the carbon in the fuel bed. This reaction forms carbon monoxide and hydrogen which then burn above the fuel bed when mixed with oxygen from over-fired air or excess oxygen passing unreacted through the fuel bed. The recycled flue gas dilutes the oxygen concentration of the combustion air while maintaining the total mass of gas through the fuel bed. Without the dilution effect of the recycled flue gas, the excess oxygen present cannot be effectively used since it does not stay in the fuel bed long enough to achieve stoichiometric combustion. Therefore adding recycled flue gas does not impair the combustion process at all, but rather reduces the quantity of unreacted oxygen that would otherwise pass through the fuel bed. Another benefit of the more reactive fuel bed is reduced smoke and other particulate emissions. Of course, the additional burning provided when the flue gas reenters the combustion chamber reduces particulate matter. However, the more reactive fuel bed produces a more complete burning of the coal which in turn leaves less material to escape in the form of particulate matter.

Additionally, the excess oxygen available tends to react with other components produced by the combustion process. For example, the carbon normally present in coal combines with oxygen to form CO, (carbon monoxide) a highly poisonous gas. Similarly, various oxides of nitrogen, i.e. $NO_x$ are produced. The elimination of $NO_x$, CO and similar noxious compounds is of primary concern to all regulatory bodies concerned with air pollution and therefore to users of apparatus which produce these compounds. It is apparent that by reducing the quantity of oxygen remaining after combustion has taken place will result in a reduction of the quantities of pollutants which have oxygen as a component thereof. As previously discussed, the prior art recognizes this concept. However, only by supplying the flue gas-air mixture in the ratio of at least approximately 25% flue gas to air below the fuel grate, as previously discussed, are the aforesaid benefits fully realized.

Recycled flue gas in ratios of approximately 25% to 50% of the total gas flow through a boiler will also control the temperature of the coal fuel bed to such a degree that the fusion temperature (approximately 2000° F.) of the ash will not be exceeded. This will allow clinker free operation at lower overall excess air than without FGR. The water vapor or moisture and carbon dioxide normally present in the flue gas provides for a heat absorption capacity greater than the air that would otherwise be present in the gas mixture within a combustion chamber. This allows for an effective cooling of the fuel bed resulting in a fuel bed temperature at which clinkering cannot occur. The present invention prevents clinkering in a coal fired boiler without the introduction of substances not available as a result of the combustion process and without reducing the efficiency of the boiler.

A further benefit is available in that calcium, if present in the fuel bed, will react with sulfur in the fuel to form nonvolatile products of CaS, $CaSO_4$ and $CaSO_3$. Although these compounds can be retained in the ashes of a boiler, the stability of the formed compounds is not great at temperatures above 2200° F. By adding calcium to the fuel and utilizing FGR as disclosed by the present invention, the temperature of the fuel bed stays below the aforesaid critical temperature and the desired result is obtained.

Finally, the boiler runs at improved fuel efficiency even at the low excess oxygen levels. This occurs because the reduced carbon monoxide emission as discussed hereinabove, minimizes the loss of the heat of combustion which would otherwise occur in the carbon monoxide to carbon dioxide reaction. Furthermore, as mentioned above, the more reactive fuel bed provides for a more complete burning of the fuel.

In operation, FGR when implemented as disclosed herein, achieves steady-state operation without the need for control mechanisms other than those which are normally present in a solid fuel fired boiler. The damper controls the quantity of flue gas to be recirculated and the quantity of flue gas to be released. By supplying the same quantity of air to be mixed with the recirculated flue gas as the quantity of flue gas released, as determined by the position of the damper, all requirements for steady-state operation are achieved. To facilitate this operation fans may be placed above the damper, in the conduit directing the flue gas from the flue to a mixing box and from an air source to the mixing box. A homogenous mixture of flue gas and air is produced in this mixing box.

In the preferred embodiment, FGR as disclosed herein is implemented on a stoker fired coal boiler. The coal feeding mechanism utilized can be any one of several commercially available units. For example, the screw mechanism described hereinbelow or gravity feed. By using a stoker in the preferred embodiment the equilibrium of the system is easily maintained. This occurs because the quantities of ambient air entering the combustion chamber are more easily controlled since there is no port or door to open and close when fuel is added to the fuel grate. Furthermore, the relatively constant rate of fuel feed enables the combustion process to provide constant quantities of heat and flue gas. An over-fire air torus with jets directed radially into the combustion chamber is disposed in the lower portion of the boiler above the grate. This torus is necessary to provide additional air necessary for proper combustion, and to insure that combustible gases are brought out of the fuel bed and are completely burned. This over-fire air may be mixed with flue gas (approximately 0%–75% flue gas).

In another embodiment, FGR as disclosed herein, can also be used in a stoker fired boiler with over-fire air provided by, for example, a second over-fire air torus in the upper portion of the combustion chamber. Although utilization of over-fire air is generally known, when it is used in a boiler utilizing the FGR technique of this invention there are significant differences. The over-fired air as utilized by this invention may be all air or of a flue gas-air mixture. In either case, the most important requirement is the quantity of over-fire air supplied, rather than the pressure it is supplied at. Existing technology uses over-fire air supplied at relatively high pressure (typically 20 to 25 inches of water compared with 5 to 10 inches of water for this invention). However, in this invention jets of larger diameter are used to provide a better penetration of and a more complete mixing of combustion gases available across the fuel bed. These jets are directed radially into the combustion chamber to enhance the mixing characteristics with the combustion products, reduce $NO_x$ emissions and provide more efficient boiler operation.

BRIEF DESCRIPTION OF THE DRAWINGS

FIG. 2 is a fragmentary plan sectional view, indicated generally by line 2—2 of FIG. 1.

FIG. 3 is a schematic side elevational view of a combustion chamber with the additional embodiments as disclosed herein.

DETAILED DESCRIPTION OF THE INVENTION

An apparatus and method are described for flue gas recirculation (FGR) in a solid fuel fired boiler. The preferred embodiment will describe FGR in a stoker fired coal boiler or furnace. An additional embodiment will be described, wherein additional over-fire air and FGR are provided in the combustion chamber of a stoker fired coal boiler.

Figure 1:
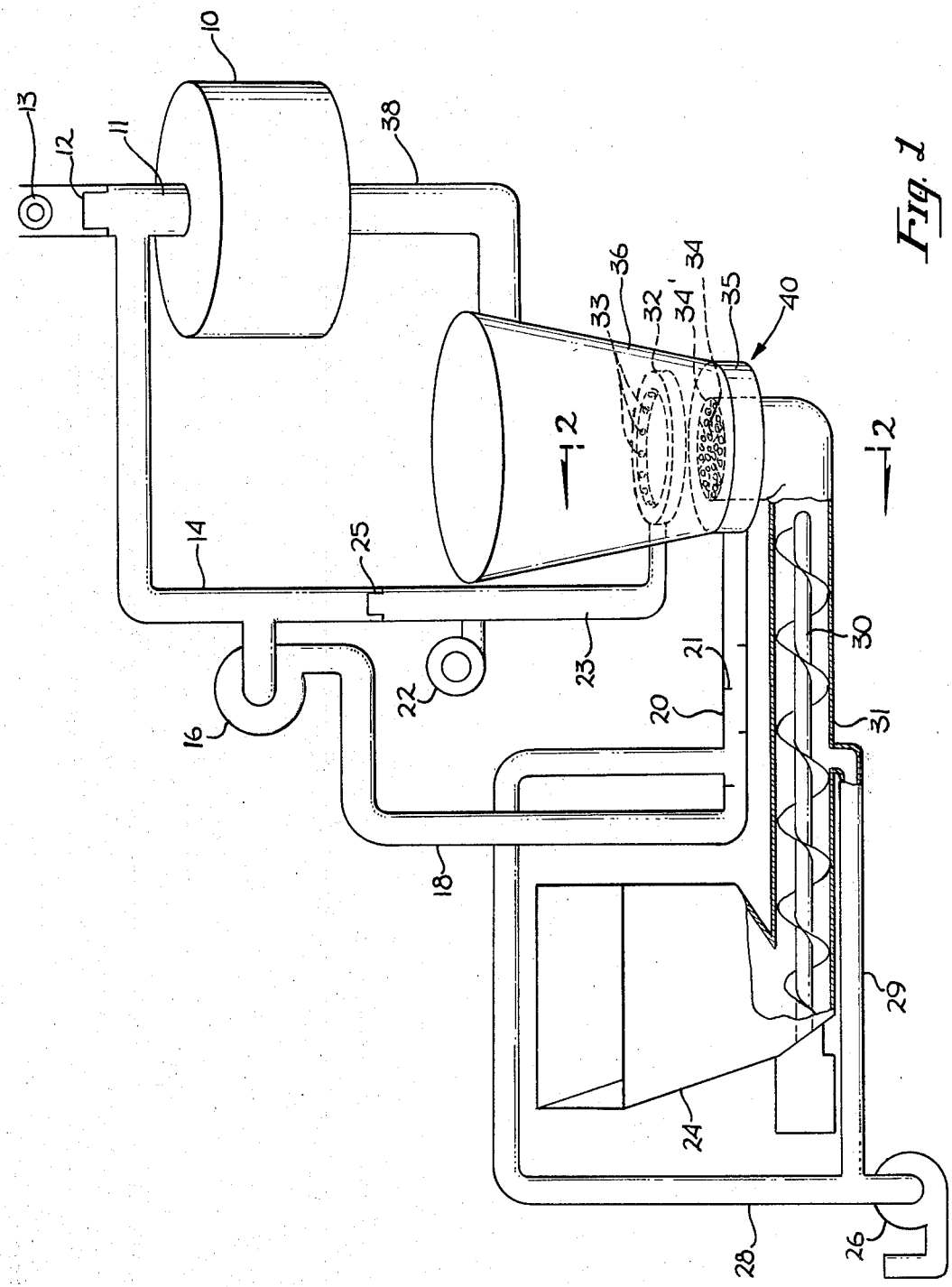
FIG. 1 is a schematic side elevational view of a stoker fired boiler incorporating the preferred embodiment of the present invention.

FIG. 1 is a schematic representation of a coal fired stoker boiler utilizing recirculated flue gas in a manner taught by this invention. The main body of the boiler 40 includes a combustion chamber 36, a fuel bed 34 supported by a grate 34', a combustion products conduit 38, a convection heat transfer section 10, a flue 11 with a damper 12, and fan 13. The additional components necessary for FGR include a FGR conduit 14, a FGR fan or blower 16, a lower FGR conduit 18, a mixing box 20, an air source fan or blower 26 for providing air at about ambient temperature and under pressure, an air source conduit 28, a FGR undergrate manifold 35, an over-fire air damper 25, an over-fire air conduit 23 with over-fire fan or blower 22, and an over-fire air torus 32 with over-fire air jets 33.

In the embodiments utilizing additional over-fired air there is as shown in FIG. 3, a second over-fire air damper 25', a second over-fire air source fan 22', a second over-fire air conduit 23', a second over-fire air torus 32' with over-fire air jets 33'.

The preferred form of a stoker mechanism itself includes a coal hopper 24, a coal screw 30 and a coal shaft 31 leading to the boiler 40. Also desirable is a cool air conduit 29 to the coal screw to keep the screw cool during stroker operation.

Fuel in the form of coal or other solid fuels (e.g. wood chips, pelletized carbonaceous materials, coke) is stored in the hopper 24. For purposes of the description of the preferred embodiment, coal is used as the solid fuel for combustion and providing an energy source. This fuel passes through the coal shaft 31 by operation of the coal screw 30 to the fuel (coal) bed 34 and grate 34' disposed within the combustion chamber 36 and adjacent the bottom surface thereof. A combustion process takes place in the combustion chamber 36. This combustion process creates gases which are channeled through combustion gas conduit 38 to the convective heat transfer section 10. The convective heat transfer section allows the removal of heat from the combustion products prior to entering the flue 11. The flue 11 is typically a hollow cylinder above the combustion chamber and convective heat transfer section of the boiler. This flue has an opening on a side wall thereof enabling FGR conduit 14 to receive flue gas (i.e., gaseous combustion products) from the flue 11 which has been drawn by FGR fan 16 and is fed into the mixing box 20 by such fan. The flue gas is channelled by by conduit 18 into mixing box 20. The quantity of flue gas available for recirculation is partially determined by the position of the damper 12 located in the flue duct 11. The more horizontal the damper 12, the more flue gas is recirculated.

The mixing box 20 includes baffles 21 which insure proper mixing of the flue gas with air (direct-fired air) channeled through air source conduit 28 from air source fan 26. It should be noted that in the preferred embodiment fan 26 may also supply air through conduit 29 which is connected to the coal screw shaft 31 to cool the coal screw 30. Substantially all of the gas flow to the undergrate manifold 35 is provided by the gas mixture in the mixing box 20. Fan 16 and fan 26 in conjunction with the damper 12 and exhaust fan 13 insure that gas supplied to the mixing box 20 is at least approximately 25% flue gas.

To achieve the results contemplated by this invention requires that the gases from the mixing box 20 pass through a substantial portion of the fuel bed 34 and grate 34' thereby allowing substantial intimate contact between the gas mixture and the fuel bed. Coal from the hopper 24 is fed by the coal screw 30 into the combustion chamber 36 from the coal shaft 31. The FGR undergrate manifold 35 shown in FIG. 2 encircles a portion of the coal shaft 31 which is under the boiler. The grate 34' has tuyeres (openings) 37 in the area immediately below the fuel bed 34. The flue gas-air mixture from mixing box 20 is drawn through these openings (which are small enough to prevent the coal from passing through them) and into the bottom surface of the coal bed 34 on the fuel grate 34' as follows. The air source fan 26 and FGR fan 16 produce a slightly pressurized area in the mixing box 20 and manifold 35. When coupled with the draft created by the exhaust fan 13, the difference in pressure between the two areas pulls the mixture from the manifold 35 into the combustion chamber 36. It should be apparent that equivalent variations of the aforesaid structure will produce similar results. It should also be understood that while a coal screw 30 is used to feed the coal to the fuel bed, any apparatus or stoker mechanism which continuously feeds coal to the fuel bed can be used. The manifold 35 in all such cases would still surround a fuel bed which is deep enough to provide adequate contact with the flue gas-air mixture for proper functioning of the boiler.

Over-fire air torus 32 is disposed above the fuel bed 34 in the lower portion of the combustion chamber. Orifices or jets 33 on the inner annular surface of the torus are directed radially into the combustion chamber. The air provided by torus 32 is cooler than the gases already in the combustion chamber. Thus this air falls onto the fuel bed 34 providing additional oxygen and mixing necessary for combustion. Over-fire air fan 22 provides air channeled through conduit 23 to the torus 32. In addition, flue gas from conduit 14, controlled by damper 25 may be mixed with the air in conduit 23.

However, the application of conventional over-fire air jets as they are applied to existing coal fired boilers may not be sufficient for the mixing required to improve the performance of the boiler when FGR is utilized. That is, the optimization of over-fire air jet mixing occurs when done with the application of FGR borne in mind. This optimization is based on the utilization of larger than normal diameter over-fire air jets to increase the penetration of the mixing gases, whether there is partially recirculated flue gas in the over-fire air system or 100% air. The larger diameter provides for greater penetration and greater mixing across the length of the fuel bed. This provides for more complete combustion in the area immediately above the fuel bed. The design criteria for these jets is based on a mixing length of no more than ten (10) diameters of a jet orifice. This provides for good coverage across the bed at relatively low pressure (e.g. 5"–10" of water). This is to be contrasted with over-fire air as utilized in existing technology wherein the orifices are quite small and a relatively high pressure air stream (e.g. 20"–25" of water) is present. In this invention, the pressure is not as important as the diameter of the orifice and the dilution of air with flue gas.

The flue gas-air mixture supplied as discussed hereinabove results in a more chemically active fuel bed and lower overall excess air operation. It is this more chemically active fuel bed and lower overall excess air operation which provide the advantages produced by this invention as previously discussed. For example, reduced pollutant emissions, clinker-free operation and more efficient utilization of fuel than without FGR as disclosed herein.

Figure 4:
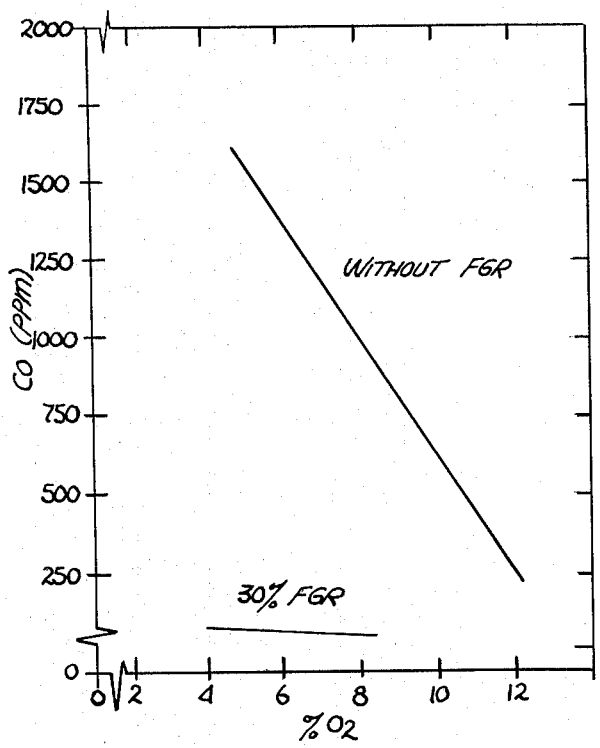
FIG. 4 is a graphic representation comparing CO released by a boiler with FGR as disclosed herein and without FGR.
Figure 5:
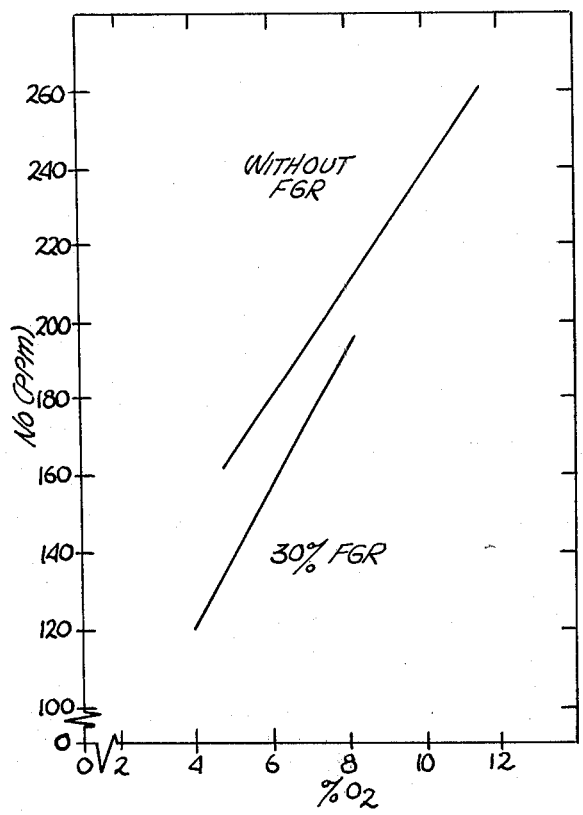
FIG. 5 is a graphic representation comparing NO released by a boiler with FGR as disclosed herein and without FGR.
Figure 6:
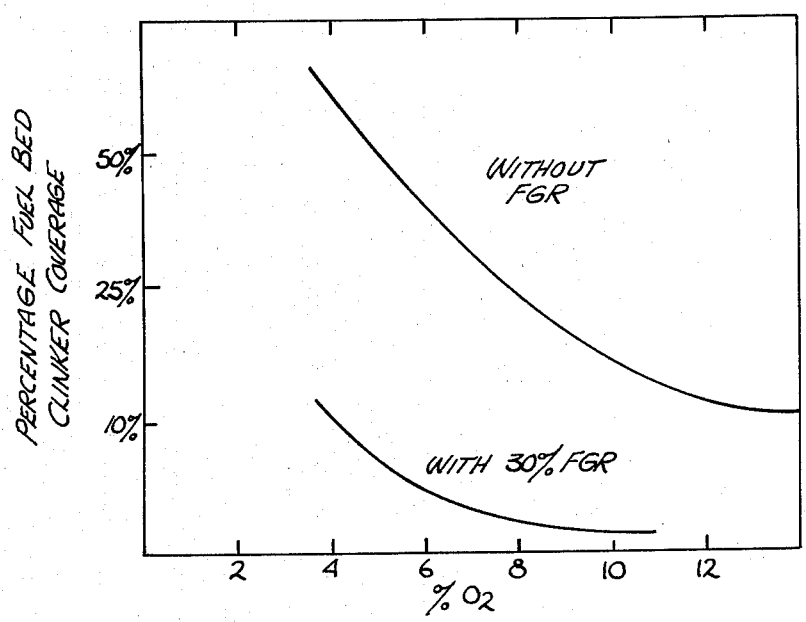
FIG. 6 is a graphic representation comparing clinker formation by a boiler with FGR as disclosed herein and without FGR.

Observations substantiating the effectiveness of FGR as disclosed herein have been made on a 10 lb/hr coal fired boiler. FIGS. 4 through 6 are graphical representations of observed data with 30% FGR introduced into the fuel bed as disclosed herein and without FGR. FIGS. 4 and 5 show parts per million (ppm) CO and NO respectively, released as a function of percentage of excess oxygen corrected to 3% dry excess oxygen. FIG. 6 shows percentage of fuel bed clinker coverage as a function of percentage of excess oxygen. Table 1 (below) shows ppm $SO_2$ released at 3% dry excess oxygen when calcium is added to the fuel to produce a calcium to sulfur molar ratio of 2.85:1 with 30% FGR introduced into the fuel bed as described herein and without FGR. Table 1 also contains the average temperature as measured at the grate 34 near the tuyeres 37 and at the aforesaid conditions.

TABLE 1

| Fuel: Lignite Pellets with a calcium to sulfur molar ratio of 2.85:1 | $SO_2$ Emission, ppm at 3% dry Excess $O_2$ | Grate temperature |
|---|---|---|
| Without FGR | 1060 | 380° F. |
| With FGR | 515 | 139° F. |

Further improvements in boiler operation can be obtained by providing in addition to the FGR as described hereinabove a second over-fire air source in the combustion chamber. Referring to FIG. 3, the additional components are the damper 25' within a portion of FGR conduit 14 for controlling the quantity of flue gas to mix with over-fire air from fan 22'. The air or air-flue gas mixture is channeled through conduit 23' to over-fire air torus 32'. This second over-fire air torus 32' is typically in the upper portion of the combustion chamber 36. The portion of the torus 32' should be chosen such that the temperature of the combustion air at the location of the torus 32' is approximately 2000° F. The over-fire air introduced at this point should be sufficient in quantity to lower the temperature of the combustion air to about 1750° F. This is necessary because at temperatures significantly different from 1750° F. will not provide the optimum reduction of $NO_x$, but may in fact increase $NO_x$ emissions. Over-fire air jets 33' disposed on the inner annular surface of torus 32' direct radially into the combustion chamber 36. The discussion regarding the relative diameters of these jets or orifices apply equally to this second torus as to the torus above the fuel bed as described hereinabove. A boiler incorporating the additional torus will have a further reduction of $NO_x$ emissions. As will be obvious to one skilled in the art, the shape of members incorporating the jets need not be a torus, but may vary depending on the particular boiler used.

Thus a method and apparatus of utilizing FGR in a stoker fired coal boiler have been described. The specific embodiments described served as examples. However, it should be obvious to one skilled in the art that the method taught is applicable to other embodiments of solid fuel fired boilers or furnaces.

We claim:

1. In a solid fuel fired boiler having a combustion chamber, a fuel grate means for supporting a solid fuel bed, said solid fuel bed disposed within said combustion chamber for purposes of providing an energy source for combustion, and fuel means allowing for the exit of gaseous products from the combustion of the solid fuel within said combustion chamber, the improvement comprising:
   (a) means for recirculating a first predetermined quantity of gaseous products from said flue means to a bottom surface of said solid fuel bed, said quantity of gaseous products having an amount of moisture and carbon dioxide sufficient to lower the temperature of said solid fuel bed on said fuel grate;
   (b) means for mixing said recirculated gaseous products with air prior to recirculating said gaseous products to said solid fuel bed, said means for mixing forming a first mixture of said gaseous products and air;
   (c) over-fire air means for providing a second mixture of a second predetermined quantity of gaseous products from said flue means and air as over-fire air above said solid fuel bed;
   whereby said solid fuel bed operates at a lower temperature and the combustion of the solid fuel is more chemically active.

2. The apparatus defined by claim 1 further comprising a solid fuel hopper and stoker means for feeding solid fuel from said hopper to said solid fuel grate.

3. The apparatus defined by claim 1 wherein said recirculation means for said gaseous products comprise:
   (a) a wall of said flue means having an opening coupled to a first end of a conduit, said conduit having a second end coupled to said mixing means;
   (b) damper means for directing said first predetermined quantity of gaseous products from said flue means to said conduit;
   (c) fan means disposed within said conduit for feeding said gaseous products from said flue means through said conduit to said mixing means.

4. The apparatus defined by claim 1 wherein said grate means for the solid fuel comprises an undergrate manifold coupled to receive the gas mixture from said mixing means to allow said gas mixture to intimately contact said solid fuel bed.

5. The apparatus defined by claim 1 wherein said first predetermined quantity of recirculated gaseous products is approximately 25% to 50% of the total gas fed to said mixing means.

6. The apparatus defined by claim 1 wherein said air is introduced into said mixing means under pressure.

7. The apparatus defined by claim 1 wherein said over-fire air means comprise:
   (a) an over-free source disposed outside said combustion chamber;
   (b) at least one over-fire air jet disposed adjacent to and above said fuel grate, said jet coupled to a first end of a conduit, said conduit having a second end coupled to said over-fire air source;
   whereby over-fire air provides additional air for the combustion of said solid fuel and mixes combustible gases from said fuel bed.

8. The apparatus defined by claim 7 wherein said second predetermined quantity of recirculated gaseous products comprise approximately 0% to 75% of the over-fire air delivered by said over-fire source.

9. The apparatus defined by claim 1 wherein said solid fuel is coal.

10. The apparatus defined by claim 1 further comprised of second over-fire air means for providing additional over-fire air to reduce $NO_x$ emissions.

11. The apparatus defined by claim 10 wherein said second predetermined quantity of gaseous products comprise approximately 0% to 50% of the over-fire air provided by said second over-fire air means.

12. In a solid fuel fired boiler having a combustion chamber, a fuel grate means for supporting a solid fuel bed, said solid fuel bed disposed within said combustion chamber for purposes of providing an energy source for combustion, and flue means allowing for the exit of gaseous products from the combustion of the solid fuel within said combustion chamber, the improvement comprising:
   (a) a wall of said flue means having an opening coupled to a first end of a conduit;
   (b) damper means for directing a first predetermined quantity of gaseous products from the combustion to said conduit;
   (c) means for mixing a first mixture of said first predetermined quantity of gaseous products and air prior to recirculating said gaseous products to said solid fuel bed, said mixing means coupled to a second end of said conduit;
   (d) fan means disposed within said conduit for removing said gaseous products from said flue means such that approximately 25% to 50% of the first mixture of said air and said gaseous products delivered to said mixing means is said gaseous products;

(e) over-fire air means for providing over-fire air above said solid fuel bed, said over-fire air comprising a second mixture of a second predetermined quantity of said gaseous products and air;

whereby said solid fuel bed operates at a lower temperature and the combustion of the solid fuel is more chemically active.

13. The apparatus defined by claim 12 wherein said grate means for the solid fuel comprises an undergrate manifold coupled to receive the gas mixture from said mixer means.

14. The apparatus defined by claim 13 wherein said fuel grate means further comprises openings in an area below said fuel bed, said openings coupled to receive said gas mixture within said fuel undergrate manifold allowing said gas mixture to intimately contact said solid fuel bed.

15. The apparatus defined by claim 14 wherein said over-fire air means comprise:
   (a) an over-fire air source disposed outside said combustion chamber;
   (b) at least one over-fire air jet disposed adjacent to and above, said fuel grate coupled to a first end of a conduit, said conduit having a second end coupled to said over-fire air source;
   whereby over-fire air provides additional air for the combustion of said solid fuel and mixes combustible gases from said fuel bed.

16. The apparatus defined by claim 15 wherein said over-fire air source is comprised of ordinary air and said gaseous products.

17. The apparatus defined by claim 16 wherein said second predetermined quantity of gaseous products comprise approximately 0% to 75% of the over-fire air supplied by said over-fire air source.

18. A solid fuel fired boiler comprising:
   (a) a combustion chamber;
   (b) a hopper coupled to said combustion chamber by a shaft, said shaft having a screw to deliver fuel from said hopper to a fuel grate disposed within said combustion chamber;
   (c) a flue coupled to an upper surface of said combustion chamber to allow the exit of gaseous products produced by combustion within said combustion chamber;
   (d) means for removing a predetermined quantity of said gaseous products from said flue;
   (e) means for mixing said predetermined quantity of said gaseous products with air such that approximately 30% of the mixture is said gaseous products;
   (f) means for delivering said mixture to said fuel grate such that the bottom surface of a fuel bed supported by said fuel grate is in intimate contact with said mixture;
   (g) means for supplying over-fire air comprised of a second mixture of air and said gaseous products to said fuel bed to provide additional oxygen necessary for combustion within said combustion chamber and to mix combustible gases in said fuel bed;
   whereby said solid fuel bed operates at a lower temperature and the combustion of the solid fuel is more chemically active.

19. The apparatus defined by claim 18 wherein said predetermined gaseous products removal means comprise:
   (a) a damper disposed within said flue;
   (b) an opening in a wall of said flue coupled to one end of a conduit;
   (c) fan means coupled to the other end of said conduit for removing said gaseous products directed by said damper from said flue;
   (d) a second conduit one end of said second conduit coupled to said fan means, the other end of said conduit coupled to said mixing means such that said removed gaseous products are channeled into said mixing means.

20. The apparatus defined by claim 19 wherein said delivery means comprise:
   (a) a fuel undergrate manifold encircling said fuel grate, said fuel undergrate manifold coupled to said mixer means such that said mixture enters said fuel undergrate manifold;
   (b) openings on a side wall of said fuel grate, said openings allowing said mixture in said fuel undergrate manifold to be in intimate contact with said fuel bed.

21. A method for combusting solid fuels using flue gas recirculation comprising the steps of:
   (a) removing a first predetermined quantity of flue gas from a flue;
   (b) mixing said flue gas with air such that the mixture of said flue gas and air has an amount of moisture and carbon dioxide sufficient to lower the temperature of said solid fuels;
   (c) supplying said mixture of air and flue gas to the bottom surface fo a fuel bed which is being combusted;
   (d) supplying first over-fire air comprised of a second mixture of said flue gas and air to said fuel bed primarily to enhance the mixing of the gases above the fuel bed;
   whereby said fuel bed operates at a lower temperature and combustion of said fuel bed is more chemically active.

22. The method of claim 21 including supplying a mixture of said flue gas and air as first over-fire air to said fuel bed such that approximately 0% to 75% of said mixture is said flue gas.

23. The method of claim 21 including adding sufficient calcium to said fuel bed to substantially reduce emissions of formed compounds of sulfur.

24. The method of claim 23 wherein said calcium is added providing a calcium to sulfur molar ratio of 2.85 to 1 in said fuel bed.

25. The method of claim 21 further comprising the step of supplying second over-fire air introduced downstream from the introduction of said first over-fire air for purposes of reducing $NO_x$ emissions.

26. The method of claim 25 in which said second supply of over-fire air is approximately 0% to 50% flue gas.

27. The method of claim 25 in which said second supply of over-fire air is introduced where the combustion gases are at a temperature of about 2000° F. and said temperature is thereby reduced to about 1750° F.

28. The apparatus defined by claim 1 or 12 or 18 further including adjustment means for adjusting the ratio of said air to said gaseous products provided to each of said mixing means and said over-fire air means.

29. The apparatus defined by claim 7 wherein said over-fire air jet is disposed on an over-fire air torus.

30. A method for combusting solid fuels using flue gas recirculation comprising the steps of:

(a) removing a first predetermined quantity of flue gas from a flue;
(b) mixing said flue gas with air;
(c) adjusting the ratio of said flue gas-air mixture such that said mixture has an amount of moisture and carbon dioxide sufficient to lower the temperature of said solid fuels;
(d) supplying said mixture of air and flue gas to the bottom surface of a fuel bed which is being combusted;
(e) supplying first over-fire air comprised of a second mixture of said flue gas and air to said fuel bed primarily to enhance the mixing of the gases above the fuel bed;
(f) adjusting the ratio of said second flue gas-air mixture to provide additional air to allow substantially complete combustion of the gases produced by the combustion of the fuel on said fuel bed;
whereby said fuel bed operates at a lower temperature and combustion of said fuel bed is more chemically active.

31. The method defined by claim 30 further comprising the steps of:
(a) adjusting the ratio of said flue gas-air mixture such that approximately 25% to 50% of said mixture is said flue gas;
(b) adjusting the ratio of said second flue gas-air mixture such that approximately 0% to 75% of said second mixture is said flue gas.

32. The apparatus defined by claim 15 in which said over-fire air jet in disposed in an over-fire air torus.

* * * * *